Sept. 30, 1930.  J. M. HALL  1,776,972
SHOCK ABSORBER
Filed Nov. 7, 1921  3 Sheets-Sheet 2
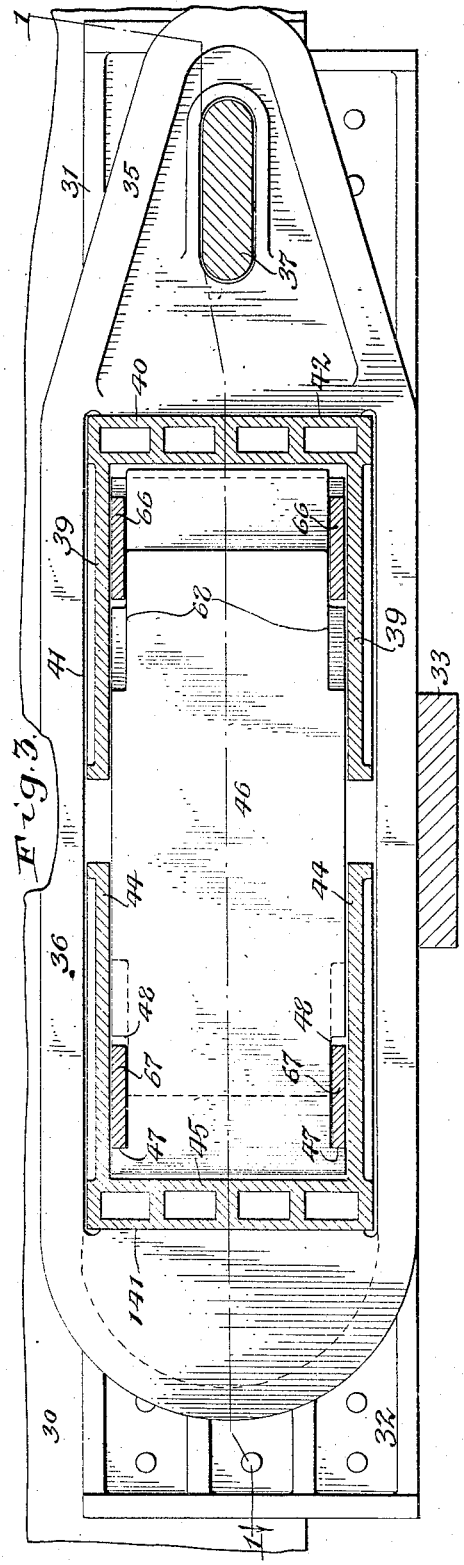
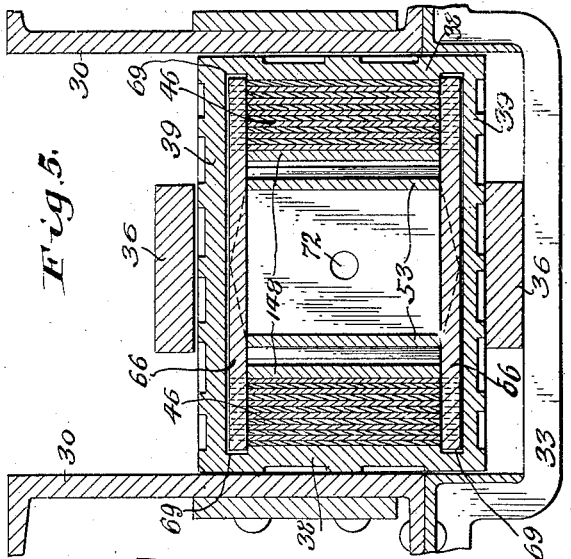
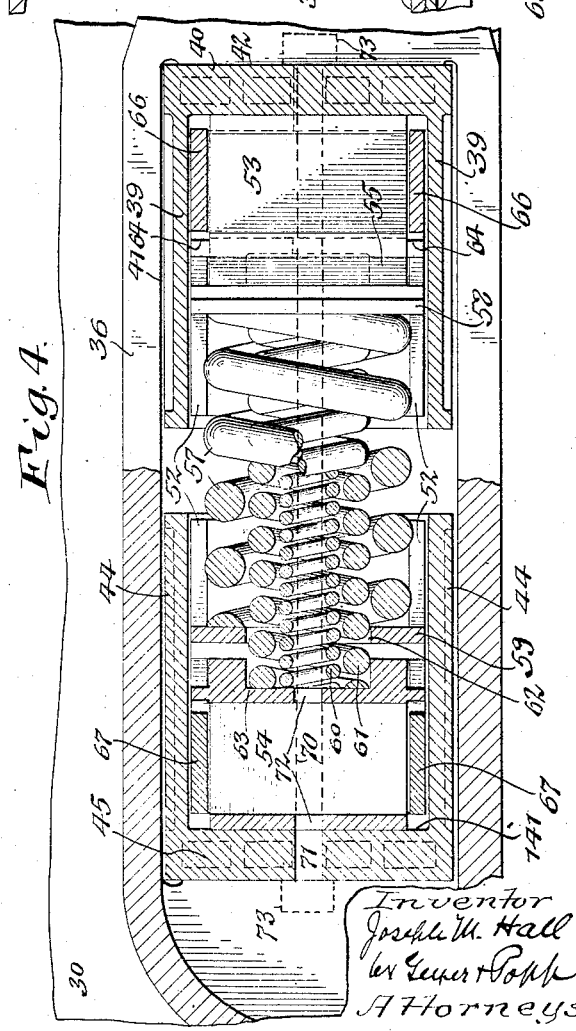

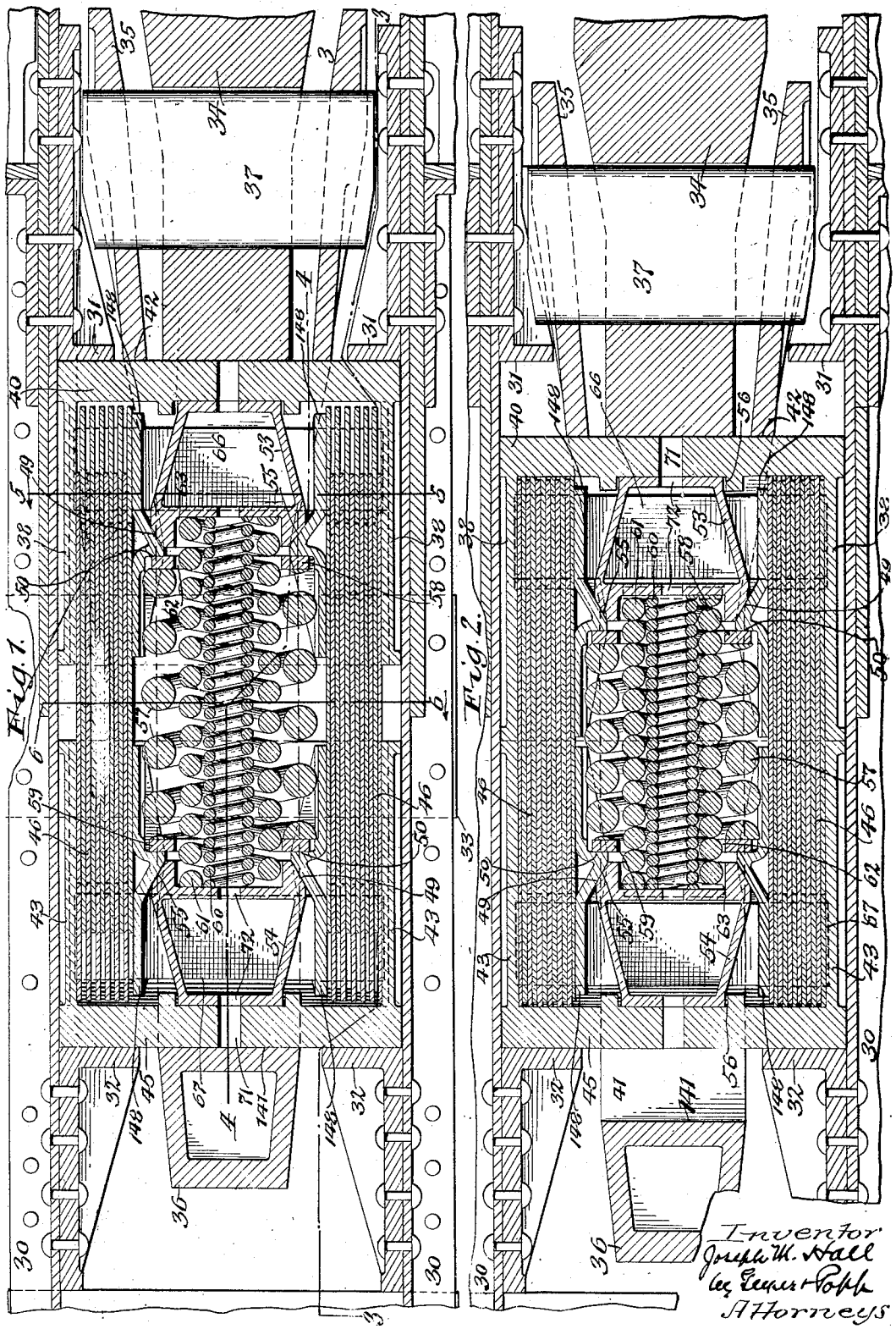

Sept. 30, 1930.   J. M. HALL   1,776,972
SHOCK ABSORBER
Filed Nov. 7, 1921   3 Sheets-Sheet 3
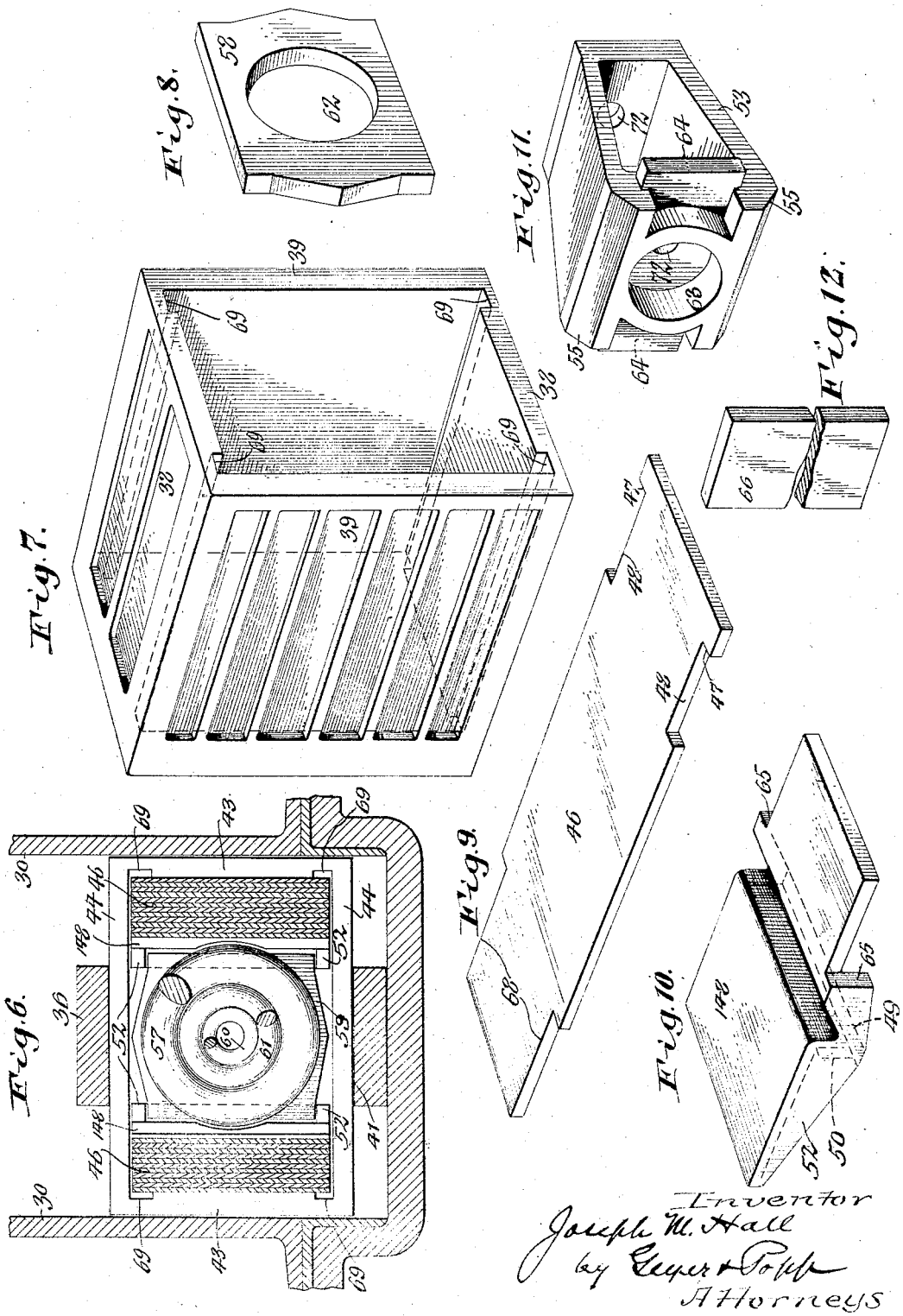

Patented Sept. 30, 1930

1,776,972

UNITED STATES PATENT OFFICE

JOSEPH M. HALL, OF HAMILTON, ONTARIO, CANADA, ASSIGNOR TO HALL DRAFT GEAR CORPORATION, OF BUFFALO, NEW YORK, A CORPORATION OF NEW YORK

SHOCK ABSORBER

Application filed November 7, 1921. Serial No. 513,220.

This invention relates to an apparatus for absorbing shock and preventing undue jarring, and possible breaking of parts subjected to a quick force when two bodies are moved suddenly relatively to each other, as for instance, when a railway car is started or stopped or coupled with another car, and also in the case of an automobile while running over an uneven road.

The chief object of this shock absorber, particularly when organized for railway service, is to employ a plurality of co-operating friction plates in such manner that they do not wear appreciably by abrasion and therefore have a long life and also present an unusually extensive frictional surface for absorbing the load or shock.

Another object of this invention is to simplify the construction and reduce the cost of manufacture by making the friction plates from rolled metal plates which are parallel sided and do not require any machining.

A further object of this invention is to secure a high frictional resistance while the co-operating friction elements are under comparatively low pressure and thus reduce wear to a minimum.

Additional objects are to employ a single spring system both ends of which are active in resistance or cushioning shock during pulling and buffing strains on a car and also operates at both ends for releasing the shock absorbing gear after each application. Also to so organize the several parts that the same form a complete assembled unit ready for installation in a car instead of requiring the parts to be shipped dismembered and parts added thereto at the place of installation and also to arrange the several parts that the same are self aligning and do not depend on the car to keep the same in place while in action.

In the accompanying drawings:

Figure 1 is a horizontal longitudinal section, taken on line 1—1, Fig. 3, and showing my invention organized for use as a friction shock absorbing gear for railway cars, the parts being represented in the position which they occupy when the gear is released. Figure 2 is a similar view showing the gear under a load completely compressed. Figures 3 and 4 are vertical longitudinal sections taken on the correspondingly numbered lines in Fig. 1. Figures 5 and 6 are vertical transverse sections, taken on lines 5—5, and 6—6, Fig. 1, respectively. Figures 7, 8, 9, 10, 11 and 12 are perspective views of some parts of the shock absorbing mechanism shown in Figs. 1–6.

Similar characters of reference refer to like parts throughout the several views.

The embodiment of my improved shock absorber or friction gear for use in railway car service shown in the drawings as a practical embodiment of my invention is constructed as follows:

30 represents the longitudinal center sills of a car frame, 31 the front draft lugs or stops on the front parts of the opposing sides of these sills, 32 the rear draft lugs or stops thereon and 33 the transverse carrying bar or iron connecting the lower sides of the sills between the front and rear draft lugs and adapted to support the shock absorber or gear and associated parts on the underside of the same.

34 represents the shank of a car coupler which has its rear end arranged between the longitudinal arms 35 at the front end of a yoke 36 and connected therewith by a transverse key 37, the lower side of said yoke resting slidingly on said carrying bar 33.

Arranged between the sills adjacent to the front and rear draft lugs and extending through the yoke are the front and rear followers, buffer heads or members each of which is preferably constructed in the form of a hollow box or casing which is rectangular in cross section. The front buffer head or member comprises two vertical longitudinal side walls 38, upper and lower horizontal longitudinal walls 39, and a vertical transverse front wall 40 connecting the front ends of the longitudinal walls 38, 39. This front buffer head extends transversely through the front part of a longitudinal slot 41 in the yoke and is adapted to engage its front side with the front end 42 of this slot and also with the front draft lugs 31 and the rear end of the coupler shank 34. The rear buffer head comprises two vertical longitudinal side walls 43, upper and lower horizontal longitudinal walls 44, and a vertical transverse rear wall 45 connecting the rear ends of the longitudinal walls 43, 44. The rear buffer head extends transversely through the rear part of the slot 41 in the yoke and is adapted to bear on its rear side against the rear end 141 of this slot and also against the rear draft lugs 32. The vertical longitudinal walls of the two buffer heads bear slidingly on their outer sides against the opposing longitudinal surfaces of the sills and are thus confined against lateral movement while effecting their longitudinal movement upon working and releasing the shock absorber.

Within the two buffer heads are arranged a plurality of friction elements which are adapted to frictionally engage each other with a longitudinal sliding movement relatively to each other and serve as a means for absorbing or taking up the shock, work or load during buffing and pulling strains when coupling or pushing the car or when pulling the same. These friction elements are preferably constructed in form of flat friction plates 46 of metal, each of which has its opposite flat longitudinal sides made parallel. A plurality of pairs of sets of such friction plates are employed, the sets of one pair being arranged lengthwise within the two buffer heads on one side thereof and the sets of the other pair within these heads on the other side thereof so that the two pairs are separated by an intervening longitudinal space. The friction plates of one set of one pair alternate with friction plates of the companion set so that these plates overlap one another and engage their flat surfaces with one another in a direction parallel and lengthwise of the direction of movement of the coupler and associated parts. The front ends of the front sets of both pairs of friction plates are adapted to be engaged by the transverse wall of the front buffer head and the rear ends of the rear sets of both pairs of friction plates are adapted to be engaged by the transverse wall of the rear buffer head. Each of these friction plates is provided on opposite edges of its outer end with an inwardly facing releasing shoulder 47 which is preferably produced by forming notches 48 in the edge of these plates, these shoulders on the corresponding ends of the several sets of friction plates being transversely in line with each other.

On the inner longitudinal side of each pair of sets of friction plates adjacent to opposite ends thereof, the same are engaged by two wedge plates 148 of metal, each of which is adapted to press transversely outward and also engage the same with a limited longitudinal sliding movement. On its inner side each of these wedge plates is provided with an incline or wedge surface 49 and an abrupt transverse shoulder 50 which are formed on opposite sides of an inward projection on this plate, said shoulders facing inwardly and said inclines facing outwardly so that the inclined faces of the wedge plates on corresponding ends of the friction plates converge inwardly. At its opposite longitudinal edges each of these wedge plates is provided with inwardly projecting guiding and stiffening flanges 52.

53, 54 represents two wedge blocks preferably made hollow of cast metal and arranged in the front and rear ends of the space between the pairs of friction plates and wedge plates, each of these blocks being provided at its inner end on its horizontally opposite side with inclines or wedge surfaces 55 which converge inwardly and engage with the correspondingly inclined faces on the pair of wedge plates at the adjacent ends of the pairs of friction plates while the outer end of this wedge block bears against the transverse wall of the adjacent buffer head and is held in a central position relatively thereto by providing the respective buffer head on the inner side of its end wall with a socket 56 which receives the outer end of the companion wedge block and retains the latter against transverse displacement.

57 represents a main spring which yieldingly resists the inward relative longitudinal movement of the front and rear wedge plates toward each other which spring is preferably of helical form and arranged within the space between the pairs of friction plates and the wedge plates associated therewith. At its front end the main spring operates on the front companion wedge plates by means of a front bridge plate 58 arranged transversely and engaging at its opposite edges with the inwardly facing shoulders 50 of the front wedge plates and engaging with the front end of the main spring. A similar bridge plate 59 is interposed between the rear end of the main spring and the inwardly facing shoulders 50 of the rear wedge plates. By this means a single main spring means co-operates with the wedge plates at the front and rear end of the shock absorber.

The opposite ends of each bridge plate are confined against displacement between the side flange 52 of the adjacent wedge plates.

60, 61 represent the inner and outer helical sections of a nested releasing spring which is arranged lengthwise within the main spring and which extends through openings 62 in the bridge plates and is seated in its opposite ends in a socket 63 formed in the inner ends of the wedge blocks for retaining this spring in place.

On its opposite sides each of the wedge blocks is provided with outwardly facing shoulders 64 and the corresponding opposite sides of the adjacent wedge plates are also provided with similar outwardly facing shoulders 65 see Fig. 10.

66, 67 represent front and rear pairs of coupling bars which are arranged transversely on opposite sides of the front and rear ends of the several pairs of friction plates so that each end of one of these bars is within the corresponding notches 48 of one set of friction plates and the outer edge of this bar faces the shoulders 47 on these plates while the inner edge of this bar faces the shoulders 64 and 65 of the respective wedge block and wedge plates. The free inner end of each friction plate is contracted or reduced in width, as shown at 68, so that the same clears the coupling bars associated with the other sets of friction plates. The vertical longitudinal walls of the buffer heads are preferably provided on their inner sides with longitudinal grooves 69 into which the ends of the coupling bars 66, 67 project which permits of making the latter sufficiently long to engage fully at all times with the friction plates and still avoid engagement of these bars at their ends with the buffer heads.

Operation

When the shock absorber is fully relaxed or released the several parts are in the position shown in Figs. 1, 3 and 4 in which the front and rear buffer heads or followers engage with the front and rear draft lugs on the sills, the two sets of friction plates of each pair are drawn apart their fullest extent, the front and rear wedge blocks and wedge plates are separated the maximum distance so that the end walls of the buffer heads do not engage the outer ends of the friction plates, the coupling bars engage the releasing shoulders 47 of the friction plates, and the releasing and main springs are expanded as far as possible within the prescribed limits and are now only under their initial tension imposed upon them when the gear was assembled or installed.

If now a pushing force is applied to the car coupler when coupling two cars of a train or when stopping the movement of the same the first effect is to push the front buffer head or follower backwardly together with the front wedge block which movement takes place without actuating the friction plates inasmuch as a slight clearance exists between the end wall of the front buffer head and the front or outer ends of the front friction plates prior to beginning the backward movement of the front buffer head, as shown in Figs. 1 and 3. During this initial backward movement of the front buffer head and wedge block the releasing spring is increasingly strained and both the front and rear wedge plates are pressed laterally outward in a direction perpendicular or at right angles to the direction of movement of the front buffer head and wedge block by the wedge action of the front wedge block against the front wedge plates and the wedge action of the rear wedge block against the rear wedge plates. In this instance the force is transmitted directly from the front wedge block to the front wedge plates, the backward movement of which latter is yieldingly resisted by the main spring, while this force is transmitted indirectly to the rear wedge plates which receive the longitudinal pressure from the main spring and engage wedgingly with the rear wedge block which latter at this time forms a stationary abutment. By this means the lateral pressure of both of the front and rear wedge plates is alike inasmuch as the same is dependent upon the tension of the same main spring, whereby the two sets of friction plates of each pair are pressed and an increased frictional engagement is effected between the opposing flat sides of the same. After this increased pressure between the several cooperating friction plates the front buffer head during its continued backward movement under the buffing or pushing force engages the front ends of the front sets of friction plates and causes the latter to move backwardly between the rear sets of friction plates which are in frictional engagement therewith, thus resisting such backward movement and cushioning the shock of the load or work in this direction. As the backward movement of the front buffer head continues the front wedge plates are also moved in this direction by the front wedge block which has the effect of still further increasing the tension of the main spring which in turn operates to increase the wedge action of both the front and rear wedge blocks on the front and rear wedge plates so that the latter are pressed with increasing force laterally and produce a proportionately greater frictional engagement between the front and rear friction plates, thus further building up the frictional resistance to the backward movement of the front buffer head under the load which produces this movement. The resistance of the shock absorber is thus gradually increased in the same measure as the front buffer head advances toward the rear buffer head until these heads finally engage each other at their opposing ends, as shown in Fig. 2, when the maximum shock absorbing capacity of the apparatus has been reached, thereby bringing the load to a state of rest gradually and with a minimum shock to the rigid parts of the car which carry the shock absorbing device and to the cargo or passengers carried by the car. During this forward or advance movement of the front wedge block, and front wedge plates the shoulders 65 of these wedge plates are moved backwardly away from the inner longitudinal edges of the front coupling bars 66 but the latter are carried backwardly by engagement of the outer longitudinal edges with the shoulders 47 of the front friction plates.

During the initial part of the inward movement of the front sets of friction plates, wedge plates and associated parts when subjected to a buffing load, the rear sets of friction plates and wedge plates are also carried inwardly or rearwardly for a short distance until the outer or rear ends of the rear sets of friction plates engage the rear follower 45, as shown in Fig. 2, after which they remain stationary and the front friction plates slide on the rear plates during the remaining buffing action of the gear.

During the first part of the forward or outward movement of the front sets of friction plates, upon removing the buffing compression on the mechanism, the rear sets of friction plates move forwardly with the front friction plates until the slack between the rear friction plates and the rear release bars 67 has been taken up after which the rear friction plates are held stationary, and the front friction plates complete their forward movement independently of the rear friction plates, whereby the front friction plates slide forwardly relative to the rear friction plates until the mechanism is fully released and both the front and rear sets of friction plates have their outer ends spaced from their respective followers 40, 45 as shown in Fig. 1.

Upon cessation of the backward pressure of the load on the front buffer head the first effect is a forward movement of the front buffer head under the action of the releasing spring which is independent of the wedge plates and friction plates which has the effect of slightly reducing the lateral pressure of the friction plates against each other by reason of the fact that the slight expansion of the main spring correspondingly weakens the same and produces a proportionately less powerful wedge action between the wedge plates and wedge blocks. As the front wedge block gradually recedes it is followed by the front wedge plates which are pressed forward by the main spring, so that the force of the wedge action continues to gradually reduce, accompanied by a reduction of the same measure in the frictional contact between the several friction plates as the tension of the main spring gradually becomes less until the front buffer head reaches the end of its forward movement against the front draft lugs. The first part of the forward releasing movement of the front buffer head and front wedge block takes place independently of the front friction plates in order to first slightly reduce the lateral pressure of the wedge plates against the friction plates and relieve the frictional contact between the same. During the forward movement of the front buffer head and front wedge block after the transverse wedge pressure of the wedge plates or shoes 148 against the friction plates has been relieved, the wedge plates or shoes 148 are moved forwardly or outwardly by the main spring resistance 57 and at the same time the front sets of friction plates are also carried forwardly by the main spring 57, due to the shoulders 65 on the front wedge plates or shoes engaging with the releasing bars 66, which bars in turn engage the shoulders 47 of the front friction plates whereby the latter are moved forwardly relative to the rear friction plates into their foremost position preparatory to effecting the next buff absorbing action. As the front wedge plates gradually move away from the rear wedge plates the main spring, although becoming gradually weaker and less effective, still exerts a sufficiently high lengthwise pressure against the wedge plates to maintain such a lateral pressure on the friction plates as will hold them under such a degree of frictional contact as to prevent a sudden release of the friction draft gear but compel the same to operate gradually and thus avoid the undesirable results which otherwise would ensue.

If during the forward or outward movement of the front buffer head and wedge block the front friction plates should stick frictionally to the rear friction plates and not move forwardly or only sluggishly or if the front friction plates should become shifted into a non-straight position then the shoulders 64 of the front wedge block will also engage the releasing bars 66 which bars engage the shoulders 47 of the front friction plates and cause the resilience of the release spring resistance 60, 61 to assist the main spring 57 in the work of pulling the front friction plates forwardly away from the rear friction plates.

The shoulders 64 on the wedge blocks 53, 54 do not perform any function whatever during normal operation of the gear either while the same is being compressed or while being released. These shoulders 64 only come into play in case of an emergency, for example, when the friction plates act slowly due to abrasion and do not promptly pull apart longitudinally upon releasing the outside resistance on the gear, in which case the release spring 60, 61 acts and the shoulders 64 of the wedge blocks engaging the inner edges of the coupling bars 66 will cause the friction plates to be moved outwardly with the followers by the aid of the releasing spring.

The action of this buffer mechanism is substantially the same when a pulling force is applied to the draft gear and then let go. In such a case the front buffer head, wedge block, wedge plates, friction plates and coupling bars remain relatively at rest while the corresponding rear members move forwardly, and upon cessation of the load the gear again relaxes into its normal condition as previously described with reference to a pushing load.

This shock absorbing mechanism is very compact in construction and forms a complete unit by itself which can be entirely assembled in the factory ready to be installed on a car without the necessity of shipping any loose or separate part with the same or requiring the addition of any further parts for completing the same at the place where the same is to be installed, as is the case with shock absorbers for this purpose now on the market.

In order to thus permit of shipping the apparatus assembled the several parts are held in their proper relative position by passing a tie bolt or rod 70 through openings 71, 72, formed centrally in the buffer heads and wedge blocks and engaging the head and nut 73 of this tie bolt with the outer sides of the buffer heads, such a tie rod being shown by dotted lines in Fig. 4.

The work or load in this friction draft gear is absorbed over a very large surface which permits of employing a comparatively low bearing pressure to obtain the desired frictional resistance between the plates without undue abrasion or wear and thus ensuring longer life for the apparatus as well as securing uniform smooth operation inasmuch as no materially changed conditions are brought about by rapid wear. Inasmuch as the friction plates have parallel flat sides which slide one upon the other this permits of making these plates of rolled plate stock which is ready for use without requiring any machining, thereby materally reducing the cost of manufacture.

Owing to the employment of a single spring system both for releasing the gear as well as obtaining the desired friction between the friction plates, the structure is greatly simplified.

Moreover the full spring capacity is utilized either when cushioning against buffing or pulling load as well as when releasing the gear after the load is removed. Furthermore, the several parts of this apparatus are self-aligning inasmuch as the same are guided upon each other during the operation of the same and do not depend upon any parts of the car which receives the same for accomplishing this purpose.

I claim as my invention:

1. A shock absorber comprising two sets of intercalated friction plates, two longitudinally movable followers which are arranged, respectively, at the outer ends of the two sets of friction plates and each of said followers adapted to effect the first part of its inward movement while the respective set of friction plates is at rest and to engage the outer ends of the same and move therewith after the initial part of the inward movement of the respective follower, wedging means which operate to press the several friction plates together transversely and which are moved inwardly and caused to exert pressure by engagement therewith of the respective followers during the first part of the inward movement of said followers and to relieve said pressure during the outward movement of said wedging means and the outward movement of said followers, transverse pressure resisting means supporting said friction plates and wedging means relatively to one another and each of the sets of plates being spaced apart from the corresponding follower in the released condition of the absorber and spring means to hold the wedging means in engagement with the plates and to release the mechanism after compression.

2. A shock absorber comprising a plurality of sets of friction plates which are slidable lengthwise relatively to each other, the plates of one set alternating with those of the other, a plurality of similar buffer members one movable lengthwise relatively to the other and each engaging against one end of one set of plates and also supporting said sets of plates on one longitudinal side thereof, wedging means operating from the opposite longitudinal sides of said sets of plates for pressing the same together in a direction at right angles to the longitudinal sliding movement of said plates, and means for retracting said friction plates when released from the effects of said wedging means comprising a releasing bar adapted to operate upon the wedging means during the opening action of the absorber.

3. A shock absorber comprising a plurality of sets of friction plates which are slidable lengthwise relatively to each other and the plates of one set alternating with another, a plurality of buffing members each engaging the outer ends of the plates of one set and also supporting said plates on one longitudinal side thereof, a plurality of wedge plates each engaging the opposite longitudinal side of said plates, a plurality of longitudinally movable wedge blocks each having wedging engagement with one of said wedge plates, spring means for releasing the wedge action of said wedge plates and blocks, and means for causing said sets of friction plates to be retracted upon relaxing the wedging engagement between said wedge plates and blocks.

4. A shock absorber comprising a plurality of sets of co-operating friction plates which alternate with each other and are capable of sliding lengthwise relatively to one another, a plurality of buffer members each supporting said plates on one of their longitudinal sides and also adapted to engage the outer ends of the same, a plurality of wedge plates each engaging with the opposite longitudinal side of one of said friction plates, a plurality of longitudinally movable wedge blocks each having wedging engagement with one of said wedge plates, spring means for moving said blocks in the direction for retracting the same from said wedge plates, and means for causing said sets of friction plates to be retracted lengthwise with said blocks.

5. A shock absorber comprising a plurality of sets of co-operating friction plates which alternate with each other and are capable of sliding lengthwise relatively to one another, a plurality of buffer members each supporting said plates on one of their longitudinal sides and also adapted to engage the outer ends of the same, a plurality of wedge plates each engaging with the opposite longitudinal side of said friction plates, a plurality of longitudinally movable wedge blocks each having wedging engagement with one of said wedge plates, spring means for moving said blocks in the direction for retracting the same from said wedge plates, and means for causing said sets of friction plates to be retracted lengthwise with said wedge plates.

6. A shock absorber comprising a plurality of sets of co-operating friction plates which alternate with each other and are capable of sliding lengthwise relatively to one another, a plurality of buffer members supporting said plates on one of their longitudinal sides and also adapted to engage the outer ends of the same, a plurality of wedge plates each engaging with the opposite longitudinal side of said friction plates, a plurality of longitudinally movable wedge blocks each having wedging engagement with one of said wedge plates, spring means for moving said blocks in the direction for retracting the same from said wedge plates, and means for causing said sets of friction plates to be retracted lengthwise with said wedge blocks and wedge plates.

7. A shock absorber comprising a plurality of sets of co-operating friction plates which alternate with each other and are capable of sliding lengthwise relatively to one another, a plurality of buffer members supporting said plates on one of their longitudinal sides and also adapted to engage the outer ends of the same, a plurality of wedge plates engaging with the opposite longitudinal side of said friction plates, a plurality of longitudinally movable wedge blocks each having wedging engagement with one of said wedge plates, a releasing spring engaging said wedge blocks and a main spring operating on said wedge plates, and means for causing said friction plates to be retracted by the pressure of said springs.

8. A shock absorber comprising a plurality of sets of friction plates which alternate with each other and are slidable lengthwise relatively to one another, two longitudinally movable buffer members each adapted to engage the outer end of one of said sets of friction plates and one of the longitudinal sides of said plates, wedge plates engaging the opposite longitudinal side of said plates at the ends thereof, wedge blocks each of which engages with one of said buffer members and also has a wedging engagement with an adjacent wedge plate and a spring resistance which forces the wedge means into engagement and returns them again to normal release position.

9. A shock absorber comprising a plurality of sets of friction plates which alternate with each other and are slidable lengthwise relatively to one another, two longitudinally movable buffer members each adapted to engage the outer end of one of said sets of friction plates and one of the longitudinal sides of said plates, wedge plates engaging the opposite longitudinal side of said plates at the ends thereof, wedge blocks each of which engages with one of said buffer members and also has a wedging engagement with an adjacent wedge plate, and a main spring interposed between said wedge plates.

10. A shock absorber comprising a plurality of sets of friction plates which alternate with each other and are slidable lengthwise relatively to one another, two longitudinally movable buffer members each adapted to engage the outer end of one of said sets of friction plates and one of the longitudinal sides of said plates, wedge plates engaging the opposite longitudinal side of said plates at the ends thereof, wedge blocks each of which engages with one of said buffer members and also has a wedging engagement with an adjacent wedge plate, a releasing spring interposed between said wedge blocks and a spring resistance which forces the wedge means into engagement and returns them again to normal release position.

11. A shock absorber comprising two pairs of sets of friction plates, the two pairs being arranged lengthwise side by side and separated by an intervening space and the plates of one set alternating and slidable longitudinally in engagement with the plates of the companion set, buffer members adapted to engage with the opposite outer ends of the several sets of friction plates and also supporting the same on their outer longitudinal sides against transverse movement, means arranged in the space between said pairs of plates and buffer members and operating to produce outward transverse pressure against the inner longitudinal side of said friction plates, and means for relaxing the transverse pressure on said friction plates comprising a releasing bar adapted to engage with said outward pressure means during the opening action of said absorber.

12. A shock absorber comprising two pairs of sets of friction plates, the two pairs being arranged lengthwise side by side and separated by an intervening space and the plates of one set alternating and slidable longitudinally in engagement with the plates of the companion set, buffer members adapted to engage with the opposite outer ends of the several sets of friction plates and also supporting the same on their outer longitudinal sides against transverse movement, wedge plates engaging the inner longitudinal sides of said friction plates adjacent to opposite ends thereof, wedge blocks each engaging with one of said buffer members and also having wedging engagement with the wedge plates at the corresponding ends of the friction plates, a releasing spring interposed between said wedge blocks, and a main spring interposed between the wedge plates at one end of the friction plates and the wedge plates at the opposite end of said friction plates.

13. A shock absorber comprising two pairs of sets of friction plates, the two pairs being arranged lengthwise side by side and separated by an intervening space and the plates of one set alternating and slidable longitudinally in engagement with the plates of the companion set, buffer members adapted to engage with the opposite outer ends of the several sets of friction plates and also supporting the same on their outer longitudinal sides against transverse movement, wedge plates engaging the inner longitudinal sides of said friction plates adjacent to opposite ends thereof, wedge blocks each engaging with one of said buffer members and also having wedging engagement with the wedge plates at the corresponding ends of the friction plates, a releasing spring interposed between said wedge blocks, bridge plates each extending across the space between two wedge plates at corresponding outer ends of the friction plates and bearing against these wedge plates, and a main spring bearing at its opposite ends against said bridge plates.

14. A shock absorber comprising a plurality of sets of co-operating friction plates which are slidable longitudinally and alternate with each other and the plates of each set being provided with inwardly facing shoulders, buffer members engaging the outer ends and one longitudinal side of said friction plates, wedge plates engaging the opposite longitudinal sides of said friction plates, wedge blocks having wedging engagement with said wedge plates and provided with outwardly facing shoulders, coupling bars arranged between said shoulders on the wedge blocks and the shoulders on the adjacent sets of friction plates and spring means to hold the wedge plates in engagement with the friction plates and to release the mechanism after compression.

15. A shock absorber comprising a plurality of sets of co-operating friction plates which are slidable longitudinally and alternate with each other and the plates of each set being provided with inwardly facing shoulders, buffer members engaging the outer ends and one longitudinal side of said friction plates wedge plates engaging the opposite longitudinal sides of said friction plates, and having outwardly facing shoulders, wedge blocks having wedging engagement with said wedge plates, and provided with outwardly facing shoulders, coupling bars arranged between the shoulders of said wedge plates and blocks on one side and the shoulders on the adjacent set of friction plates on the other side of said bars and spring means to hold the wedge plates in engagement with the friction plates and to release the mechanism after compression.

16. A shock absorber comprising a plurality of pairs of sets of friction plates arranged lengthwise side by side, the plates of one set of each pair alternating with the plates of the companion set and slidable lengthwise relatively to each other, hollow buffing members each having an outer end wall adapted to engage with the outer end of one set of friction plates and side walls engaging the outer longitudinal sides of said friction plates, and means interposed between the inner sides of said buffer members and friction plates for producing an outward pressure upon moving said buffing members relatively toward each other and to release said pressure upon moving said buffing members relatively away from each other.

17. In a friction shock absorber, the combination of a plurality of sets of friction plates, the plates of each set being intercalated with the plates of the other set and each set being movable lengthwise relatively to the other set, two followers, each of which is associated with one set of friction plates and which is adapted to effect the initial part of its inward movement while the respective set of plates is at rest and to move inwardly with the respective set of plates after the initial part of the inward movement of said follower has been effected, shoes engaging the sides of said sets of friction plates at opposite ends thereof and the shoes at each end of the plates adapted to move lengthwise relative to the shoes at the opposite end of the plates, thrust members arranged adjacent to opposite ends of said plates and each thrust member movable with the adjacent follower and having wedging engagement with the shoes at the respective end of said plates, and a spring resistance interposed between the shoes at one end of the plates and the shoes at the opposite end of the same.

18. In a friction shock absorber, the combination of a plurality of sets of friction plates, the plates of each set being intercalated with the plates of the other set and each set being movable lengthwise relatively to the other set, two followers, each of which is associated with one set of friction plates and which is adapted to effect the initial part of its inward movement while the respective set of plates is at rest and to move inwardly with the respective set of plates after the initial part of the inward movement of said follower has been effected, shoes engaging the sides of said sets of friction plates at opposite ends thereof and the shoes at each end of the plates adapted to move lengthwise relative to the shoes at the opposite end of the plates, thrust members arranged adjacent to opposite ends of said plates and each thrust member movable with the adjacent follower and having wedging engagement with the shoes at the respective end of said plates, a spring resistance interposed between the shoes at one end of the plates and the shoes at the opposite end of the same, and a spring resistance interposed between the thrust member at one end of the plates and the thrust member at the opposite end of the plates.

19. A shock absorber comprising two sets of intercalated friction members, two follower means movable lengthwise inwardly and outwardly relative to one another and each spaced from said sets of friction members in the released condition of the absorber and to effect the initial part of its inward stroke while the corresponding set of friction members is at rest and each follower means being adapted to engage the respective set of friction members and move with the same longitudinally during the remainder of said inward stroke, transverse wedge pressure creating means interposed between each follower means and said friction members and having co-operating wedge surfaces for causing the friction members to be pressed transversely together with increased pressure upon moving one of said follower means longitudinally inward relative to the other follower means, transverse pressure resisting means for supporting said friction members and said transverse pressure creating means relatively to one another, and a spring resistance means which is increasingly stressed during compression of the mechanism; and means which carry the reaction of said spring resistance means past the co-operating wedge surfaces of said transverse wedge pressure creating means to said friction members for returning the latter to normal position.

20. A shock absorber comprising two sets of intercalated friction members, two follower means movable lengthwise inwardly and outwardly and each spaced from one of said sets of friction members in the released condition of the absorber and to effect the initial part of its inward stroke while the corresponding set of friction members is at rest and each follower means adapted to engage the respective set of friction members during the remainder of said inward stroke for causing the respective follower means and friction members to move inwardly together, transverse wedge pressure creating means interposed between each follower means and the corresponding end of said sets of friction members and having co-operating wedge surfaces for causing the friction members to be pressed transversely together with increased pressure upon moving one of said follower means longitudinally inward relative to the other, transverse pressure resisting means at opposite ends of said sets of friction members for supporting said friction members and said transverse wedge pressure creating means relatively to one another, a spring resistance means; and means for causing said spring resistance means to move said sets of friction members longitudinally outward relative to one another upon relaxing the absorber and operating on said friction members by carrying the pressure of said spring resistance means past the co-operating wedge surfaces of said transverse wedge pressure creating means.

21. A shock absorber comprising two sets of friction members having their opposing inner ends intercalated, two follower means movable lengthwise inwardly and outwardly toward and from one another and each spaced apart from the outer end of one of said sets of friction members in the released condition of the absorber and to effect the initial part of its inward stroke while the corresponding set of friction members is at rest and each follower means adapted to engage the outer end of the respective set of friction members and cause the respective moving follower means and corresponding set of friction members to move lengthwise together during the remainder of said inward stroke, transverse wedge pressure creating means interposed between each follower means and the corresponding ends of said sets of friction members and having co-operating wedge surfaces for causing the friction members to be pressed transversely together with increased pressure upon moving one of said follower means longitudinally inward relative to the other, transverse pressure resisting means at opposite ends of said sets of friction members for supporting said friction members and said transverse wedge pressure creating means relatively to one another, a main spring resistance means; means for moving said sets of friction members longitudinally outward relative to one another upon relaxing the absorber and operating on said friction members by carrying the pressure of said main spring resistance means past the co-operating wedge surfaces of said transverse wedge pressure creating means, and a releasing spring means interposed between said follower means for moving the same longitudinally outward.

22. A shock absorber comprising two sets of intercalated friction members, two follower means movable lengthwise inwardly and outwardly and each spaced from one of said sets of friction members in the released condition of the absorber and to effect the initial part of its inward stroke while the corresponding set of friction members is at rest and each follower means adapted to engage the respective set of friction members during the remainder of said inward stroke, and cause the respective follower means and friction members to move together, transverse wedge pressure creating means interposed between each follower means and the corresponding ends of said sets of friction members and having co-operating wedge surfaces for causing the friction members to be pressed transversely together upon moving one of said follower means longitudinally inward relative to the other, transverse pressure resisting means at opposite ends of said sets of friction members for supporting the latter and said transverse wedge pressure creating means relatively to one another, a main spring resistance means; means for moving said sets of friction members longitudinally outward relative to one another upon removal of the load and operating on the respective friction members by carrying the reaction of said main spring resistance means past the co-operating wedge surfaces of said transverse wedge pressure creating means to the friction members, a releasing spring means interposed between said follower means for moving the latter longitudinally outward and producing a clearance between said follower means and the outer ends of said friction members in the released condition of the mechanism, and supplemental restoring means whereby the releasing spring means is coupled with said friction members for causing the latter to move outwardly with the follower means.

23. A friction draft gear comprising opposed sets of intercalated friction plates slidable lengthwise relatively to each other, opposed follower means separated respectively from said sets of friction plates during normal condition of the gear and effecting an initial inward movement while the friction plates are at rest and completing their inward movement with said friction plates, opposing wedging devices engaging said friction plates at opposite ends thereof and actuated by said follower means for creating transverse pressure on said friction plates, pressure resisting devices supporting said friction plates and said wedging devices relatively to one another, spring resistance means opposing inward movement of said wedging devices, and means for transferring expanding pressure from said spring resistance means to said friction plates and passing by the co-operating angles of said wedging devices for effecting longitudinal return movement of the friction plates to their normal position.

24. A shock absorber comprising two sets of intercalated friction plates, two longitudinally movable followers which are arranged, respectively, at the outer ends of the two sets of friction plates and each of said followers adapted to effect the first part of its inward movement while the respective set of friction plates is at rest and to engage the outer ends of the same and move therewith after the initial part of the inward movement of the respective follower, wedging means which operate to press the several friction plates together transversely and which are moved inwardly and caused to exert pressure by engagement therewith of the respective followers during the first part of the inward movement of said followers and to relieve said pressure during the outward movement of said wedging means and the outward movement of said followers, transverse pressure resisting means supporting said friction plates against said wedging means, and each of the sets of plates being spaced apart from the corresponding follower in the released condition of the absorber, and spring means to hold the wedging means in engagement with the plates and to release the mechanism after compression, said spring means effecting the initial part of its expansion while the respective sets of friction plates are at rest and said spring means operating on said friction plates after said initial part of its expansion and moving both of said sets of plates outwardly into their normal position.

25. A shock absorber comprising two sets of intercalated friction members, two follower means movable lengthwise inwardly and outwardly relatively to one another and each spaced from one of said sets of friction members in the released condition of the absorber and to effect the initial part of its inward stroke while the corresponding set of friction members is at rest and each follower means adapted to engage the respective set of friction members and compel the respective follower means and friction members to move longitudinally inward together during the remainder of said inward stroke, transverse wedge pressure creating means interposed between each of said follower means and the adjacent ends of said friction members and having co-operating wedge surfaces for causing the friction members of the respective sets to be pressed transversely together with increased pressure upon moving one of said follower means longitudinally inward relative to the other follower means, transverse pressure resisting means for supporting said friction members of the respective sets in opposition to said transverse pressure creating means, a restoring spring resistance means which is increasingly loaded during compression of the mechanism, return means which is acted on by said restoring spring resistance and which operates to move one of said sets of friction members longitudinally apart from the other set of friction members upon relaxation of the mechanism, said return means forming part of said transverse wedge pressure creating means, and a releasing spring resistance interposed between said follower means.

26. A shock absorber comprising two sets of intercalated friction members, two follower means movable lengthwise inwardly and outwardly relatively to one another and each follower means spaced from one of said sets of friction members in the released condition of the absorber and to effect the initial part of its inward stroke while the corresponding set of friction members is at rest and each follower means being adapted to engage the respective set of friction members and move with the same longitudinally during the remainder of said inward stroke, transverse wedge pressure creating means interposed between each follower means and said friction members and cooperating with opposite ends of said friction members and having cooperating wedge surfaces for causing the friction members of the respective sets to be pressed transversely together with increased pressure upon moving one of said follower means longitudinally inward relative to the other follower means, transverse pressure resisting means for supporting said sets of friction members and said transverse pressure creating means relatively to one another, a spring resistance means increasingly stressed during compression of the mechanism, and return means which carry the reaction of said spring resistance means to said friction members for returning the latter to normal position and which include spring seats each interposed between said spring resistance and one of said transverse wedge pressure creating means.

JOSEPH M. HALL.